US007320134B1

United States Patent
Tomsen et al.

(10) Patent No.: US 7,320,134 B1
(45) Date of Patent: Jan. 15, 2008

(54) SYSTEM AND METHOD FOR CABLE OPERATOR CONTROL OVER ENHANCED PROGRAMMING

(75) Inventors: Mai-Ian Tomsen, Seattle, WA (US); Armando P. Stettner, Woodinville, WA (US); Martin L. Behrens, Bellevue, WA (US)

(73) Assignee: Digeo, Inc., Kirkland, WA (US)

( * ) Notice: Subject to any disclaimer, the term of this patent is extended or adjusted under 35 U.S.C. 154(b) by 1178 days.

(21) Appl. No.: 09/858,201

(22) Filed: May 15, 2001

Related U.S. Application Data

(60) Provisional application No. 60/246,542, filed on Nov. 7, 2000.

(51) Int. Cl.
*H04N 7/10* (2006.01)
*H04N 7/025* (2006.01)

(52) U.S. Cl. .................... 725/32; 725/61; 725/109; 725/113; 725/136

(58) Field of Classification Search ............ 725/32–36, 725/112–113, 110, 136, 51, 61, 109; 348/461, 348/468; 709/207–219
See application file for complete search history.

(56) References Cited

U.S. PATENT DOCUMENTS

| | | | |
|---|---|---|---|
| 5,774,170 A | | 6/1998 | Hite et al. |
| 6,177,931 B1 | | 1/2001 | Alexander et al. |
| 6,560,777 B2 | * | 5/2003 | Blackketter et al. ........ 725/110 |
| 6,698,020 B1 | | 2/2004 | Zigmond et al. |
| 6,925,649 B2 | | 8/2005 | Schwalb et al. |
| 6,973,669 B2 | * | 12/2005 | Daniels ...................... 725/112 |
| 6,980,972 B1 | * | 12/2005 | Allibhoy et al. .............. 705/51 |
| 2001/0037500 A1 | * | 11/2001 | Reynolds et al. ............. 725/36 |
| 2002/0056089 A1 | | 5/2002 | Houston |
| 2002/0108128 A1 | * | 8/2002 | Lash et al. ................... 725/148 |
| 2002/0162117 A1 | * | 10/2002 | Pearson et al. ............. 725/109 |
| 2002/0169885 A1 | * | 11/2002 | Alao et al. .................. 709/230 |

OTHER PUBLICATIONS

Mixed Signals Technologies; http://www.mixedsignlas.com/technology/ipdbridge.html.
Enhanced Content Specification: ATVEF, Copyright 1998, 1999; http://atvef.com/library/spec1-1a.html.
Office Action of Jun. 5, 2007, U.S. Appl. No. 10/106,813, filed Mar. 26, 2002.
Office Action of Dec. 15, 2006, U.S. Appl. No. 10/106,813, filed Mar. 26, 2002.

* cited by examiner

*Primary Examiner*—Ngoc Vu
(74) *Attorney, Agent, or Firm*—Kory D. Christensen; Stoel Rives LLP

(57) ABSTRACT

A system and method are described for allowing cable operators to actively block, pass through, modify, append, filter, or replace triggers corresponding to various forms of enhanced content being transmitted across a cable system. Accordingly, cable operators may offer enhanced content customized for their subscribers and earn additional fees for local advertising and other closely allied services.

5 Claims, 12 Drawing Sheets

SYSTEM AND METHOD FOR CABLE OPERATOR CONTROL OVER ENHANCED PROGRAMMING

RELATED APPLICATIONS

The present application is related to and claims priority from U.S. provisional application No. 60/246,542, entitled "Systems and Methods for Viewer Trigger in Enhanced Television and Cable Operator Control over Enhanced Programming," filed Nov. 7, 2000, with inventors Mai-Ian Tomsen, Martin L. Behrens, and Armando P. Stettner, which is incorporated herein by reference in its entirety.

BACKGROUND OF THE INVENTION

1. Field of the Invention

The present invention relates generally to the field of interactive television systems and, more particularly, to a system and method for cable operator control over enhanced programming.

2. Description of Related Background Art

Traditionally, the term "broadcasting" relates to the electromagnetic transmission of content by radio and television stations. However, with the development of cable and satellite networks, as well as the Internet, the meaning of the term has expanded to include the distribution of any type of media to multiple recipients using any transport method. For example, content is now being broadcast via packet switched networks, telephone networks, and the like.

In order to broadcast television programming from the television station to the viewer, the broadcaster divides the content of the program into video streams. Video streams for a television broadcast typically include a sequence of video frames or images that combine to form a moving image. Each video frame is referred to as a raster and includes a plurality of scan lines transmitted and displayed sequentially. Video streams can be either analog or digital.

Traditionally, television sets have displayed only analog video streams. However, digital televisions and digital video broadcasting techniques are growing in popularity. For example, television and radio broadcasts are currently being sent over both analog and digital systems using terrestrial, cable, satellite, and packet switched networks. (e.g., the Internet)

Gradually, broadcast television and Internet technologies are beginning to converge. Specifically, access to the World Wide Web via Internet-enabled television systems is growing in popularity, particularly as the convergence allows television viewers to access enhanced content. Enhanced content may include, for example, additional information about the television broadcast, related Internet website links, images, streaming video, e-commerce opportunities, and the like.

Enhanced content may be encoded within analog video streams. For example, cathode ray tubes (CRTs), as used in nearly all televisions and computer monitors, require a small amount of time for the scanning circuitry to return to the top of the screen after displaying the last line at the bottom of the screen. Video signal standards recognize this fact by inserting a number of "blank" lines at the beginning of each new video frame, which form a vertical blanking interval (VBI). During the VBI, the need to transmit video frame information is suspended and enhanced content may be encoded into the video stream.

Similarly, enhanced content may be encoded within digital video streams. With the development of various encoding algorithms, such as MPEG (Motion Picture Experts Group), digital video streams may be transmitted to, and displayed on, a variety of devices. Digital broadcasting algorithms typically divide the video stream into a sequence of data elements called "packets." Each packet typically includes a header, which may be used to store information about the packet or the program to which it pertains. Generally a number of additional enhanced content packets can be added to the video stream without adversely affecting the quality of the digital broadcast.

Additionally, the Advanced Television Enhancement Forum (ATVEF) standard provides a mechanism for delivering interactive television experiences of enhanced content to a variety of television, set-top, and PC-based receivers. The ATVEF standard delivers enhanced content by embedding "triggers" into a television broadcast. Triggers allow content developers, broadcasters, or cable operators to insert real-time prompts into the video stream when enhanced content is available to the viewer. Among other information, a trigger may contain a network address, such as a Universal Resource Locator (URL), that defines the location of the enhanced content. Other optional information often included in a trigger include a human-readable name, an expiration date, and a script.

ATVEF enhanced content referenced by a trigger may reside on the Internet, another public network, or a private network. ATVEF triggers are typically text-based and follow the basic syntax format of the EIA-76A standard, but may also be transported via EIA-608, multicast IP packets, or other transport systems.

As previously mentioned, enhanced content developers or network broadcasters may deliver enhanced content by embedding triggers into the broadcast. Conventionally, these embedded triggers pass through the cable system unchanged to be received by customers of the cable operator.

Unfortunately, conventional systems do not allow cable operators to block, append, filter, or simply replace triggers embedded in a television broadcast. From the cable operator's perspective, this is problematic because triggers, like advertisements, have monetary value to the cable operator. Additionally, since triggers may actually annoy viewers with irrelevant links, providing cable operators with control over triggers may increase viewer satisfaction with the cable service. Moreover, triggers are typically not customized to individual viewers, but are broadcast to all of the viewers receiving a particular television program. As such, many trigger links are never activated and consume valuable bandwidth that might be put to a more a productive use.

Accordingly, what is needed is a technique for providing a cable operator with control over enhanced content during a television broadcast. In particular, what is needed is a system and method for allowing a cable operator to block, append, filter, or replace embedded triggers in a television broadcast passing through the cable system.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Figure 1:
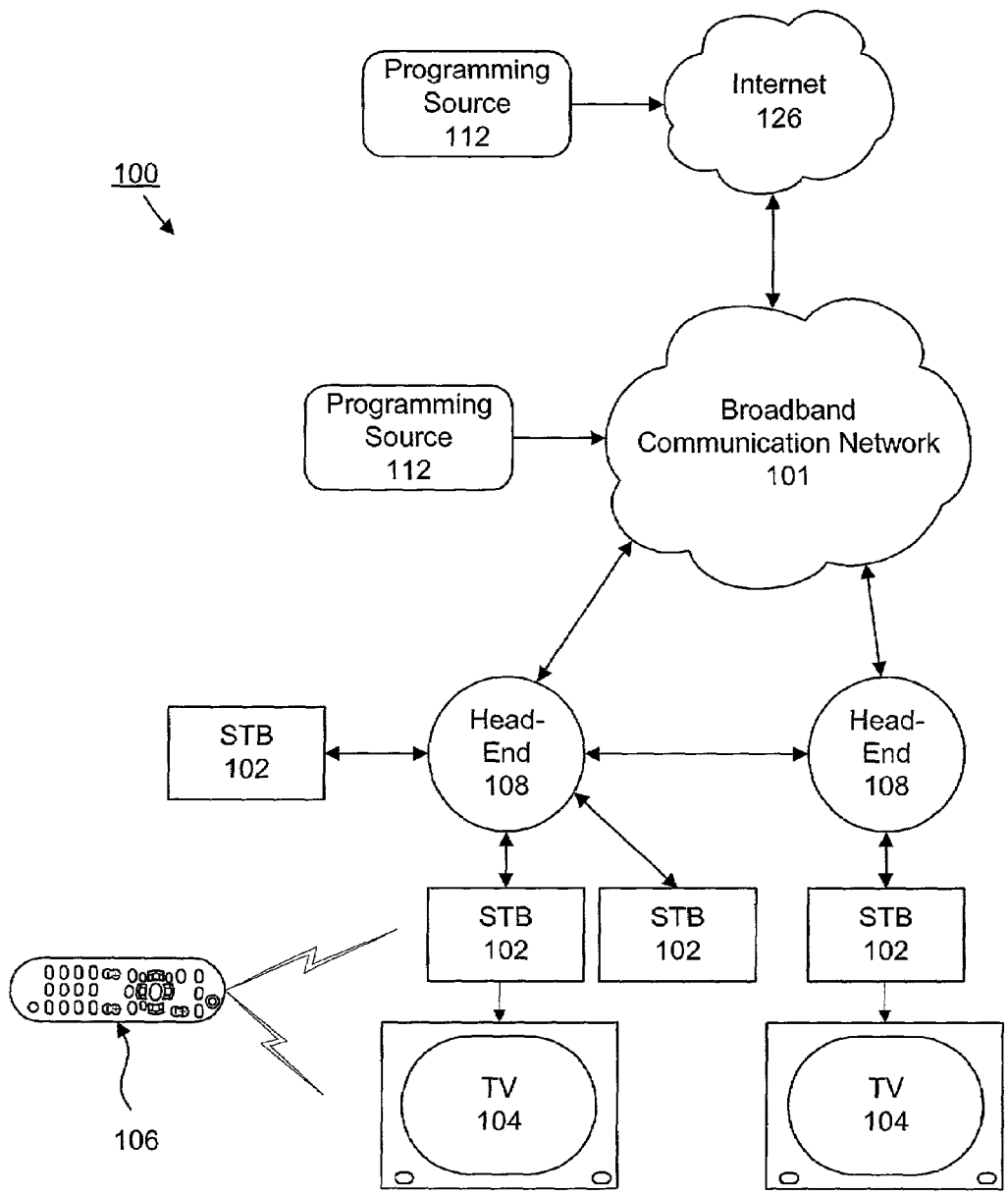
FIG. 1 is a schematic block diagram of a system for delivering television programs and enhanced content to a plurality of users.

The present invention has been developed in response to the current state of the art, and in particular, in response to these and other problems and needs that have not been fully or completely solved by currently available cable systems or broadcasting techniques. The present invention provides cable operators with control over triggers embedded within a television broadcast. For example, the cable operators may actively block, pass through, modify, append, filter, or replace triggers corresponding to various forms of enhanced content being transmitted across a cable system. Accordingly, cable operators may offer enhanced content customized for their subscribers and earn additional fees for local advertising and other closely allied services.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment.

Furthermore, the particular features, structures, or characteristics may be combined in any suitable manner in one or more embodiments. In the following description, numerous specific details are provided, such as examples of programming, user selections, network transactions, database queries, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "operator" or "cable operator" means an entity that provides cable service (e.g., distribution of television programming and other content) over a cable system or that controls the management and operation of a cable system. A "cable system" denotes a facility including a set of closed transmission paths and associated signal generation, reception, and control equipment that is designed to provide cable services.

As used herein, the term "enhanced programming" refers to television programming containing or referencing enhanced content. Examples of enhanced content include additional information about a television broadcast, links, images, streaming video, audio clips, e-commerce opportunities, and the like.

In one embodiment, enhanced programming is facilitated using triggers, which may be inserted into the video stream to notify the viewer when enhanced content is available. Triggers include links to enhanced content, or may actually include enhanced content.

One exemplary trigger format is ATVEF (Advanced Television Enhancement Forum) or, more specifically, the EIA-76A trigger format. ATVEF triggers generally include a URL followed by zero or more attribute/value pairs and closing with an optional checksum. Typically, triggers may be transported within the cable system via EIA-608, multicast IP packets, or other transport mechanisms.

Various mechanisms may be used to encode or "embed" triggers for each delivery standard. In one embodiment, using an NTSC binding, triggers are encoded on the text2 (T2) channel of line 21 using the EIA-746A system. Triggers may contain a locator link or pointer, but may also include HTML, URML, DHML, JAVA, or other private data files that are readable by the user's viewer.

Another exemplary trigger format incorporates the enhanced content into packets encoded using various algorithms, such as MPEG (Moving Picture Experts Group). Each packet typically includes a header, which may be used to store information about the packet or the program to which the packet pertains. Generally a number of packets, including enhanced content can be added to the video stream without adversely affecting the quality of the digital broadcast.

As previously noted, content developers, network broadcasters, or programming providers generate and embed triggers into a broadcast. Conventionally, embedded triggers pass through cable systems to the subscribers unmodified by the cable operator.

The present invention enables the cable operator to block, pass-through, append, modify, filter, or simply replace the triggers being sent through their cable system. Through modification and manipulation of the embedded triggers, the cable operators may customize triggers for their subscribers. As described more fully below, this may be accomplished in various embodiments via software or hardware modules that monitor the video stream for triggers.

For example, if the cable operator chooses to pass through the trigger, the viewer receives the trigger originally provided by the producer, network, or programmer. Alternatively, when the cable operator chooses to block the trigger, the viewer cannot receive the enhanced content associated with the trigger.

The cable operator may also choose to append content or links to the original trigger, in which case the viewer has access to both the original content and the appended or newly referenced content. Likewise, the cable operator may choose to replace the trigger with another trigger, such that the user is given access to a different set of enhanced content.

FIG. 1 illustrates a system 100 for delivering television programs and enhanced content to a plurality of subscribers. In one implementation, the system 100 includes a broadband communication network 101, such as a cable network. However, other networks are contemplated, one particular example of which is a satellite network.

In one configuration, the system 100 includes a plurality of set top boxes (STBs) 102 located, for instance, at customer homes. Generally, an STB 102 is a consumer electronics device that serves as a gateway between a customer's television and the network 101. In alternative embodiments, an STB 102 may be embodied as a personal computer, an advanced interactive television set, or other type of client terminal.

In one embodiment, an STB 102 receives encoded television signals and other information from the network 101 and decodes the same for display on a coupled television 104 or other display device (such as a computer monitor, flat panel display, or the like). As its name implies, an STB 102 is typically located on top of, or in close proximity to, the television 104.

Each STB 102 may be distinguished from other network components by a unique identifier, number, code, or address, examples of which include an IP (Internet Protocol) address or media access control (MAC) address. Thus, video streams, enhanced content, and other information may be transmitted from the network 101 to a specific STB 102 by specifying a corresponding address. The network 101 then routes the transmission to its destination using conventional techniques. The transmission uses various standard protocols, well known to those skilled in the art.

A remote control 106 is provided, in one embodiment, for convenient remote operation of an STB 102. The remote control 106 may use infrared (IR), radio frequency (RF), or other wireless technologies to transmit control signals to the STB 102 and the television 104. Other remote control devices are also contemplated, such as wired or wireless keyboards (not shown).

In one embodiment, each STB 102 is coupled to the network 101 via a head-end 108 or other distribution center. In the context of a cable network, a head-end 108 is a centrally located facility where television programs are received from a local cable TV satellite downlink or other source and packaged together for transmission to customer homes. In one configuration, head-end 108 routes audio/video streams and other data to and from the various STB 102 devices serviced thereby. As such, the head-end 108 functions in a manner similar to a Central Office (CO) for audio streams in the telephone industry.

The network 101 is preferably coupled to one or more programming sources 112, which provide television programming for distribution to the STBs 102. As explained in greater detail below, the programming sources 112 may include, for example, content producers, network broadcasters, as well as the cable operator, itself.

In one embodiment, the programming sources 112 may embed triggers associated with enhanced content. Triggers may include links to data feeds, commercial and advertisement sources, image sources, streaming video sources, and other e-commerce sites, each of which may provide or are associated with various types of enhanced content during a television broadcast. Triggers are discussed in FIG. 4 in greater detail.

Additionally, the network 101 may be coupled to the Internet 126 in one embodiment. The Internet 126 is a "network of networks" and is well known to those skilled in the art. Communication over the Internet 126 is accomplished using standard protocols, such as TCP/IP (Transmission Control Protocol/Internet protocol) and the like. In one embodiment, one or more programming sources 112 may be accessible via the Internet 126.

Figure 2:
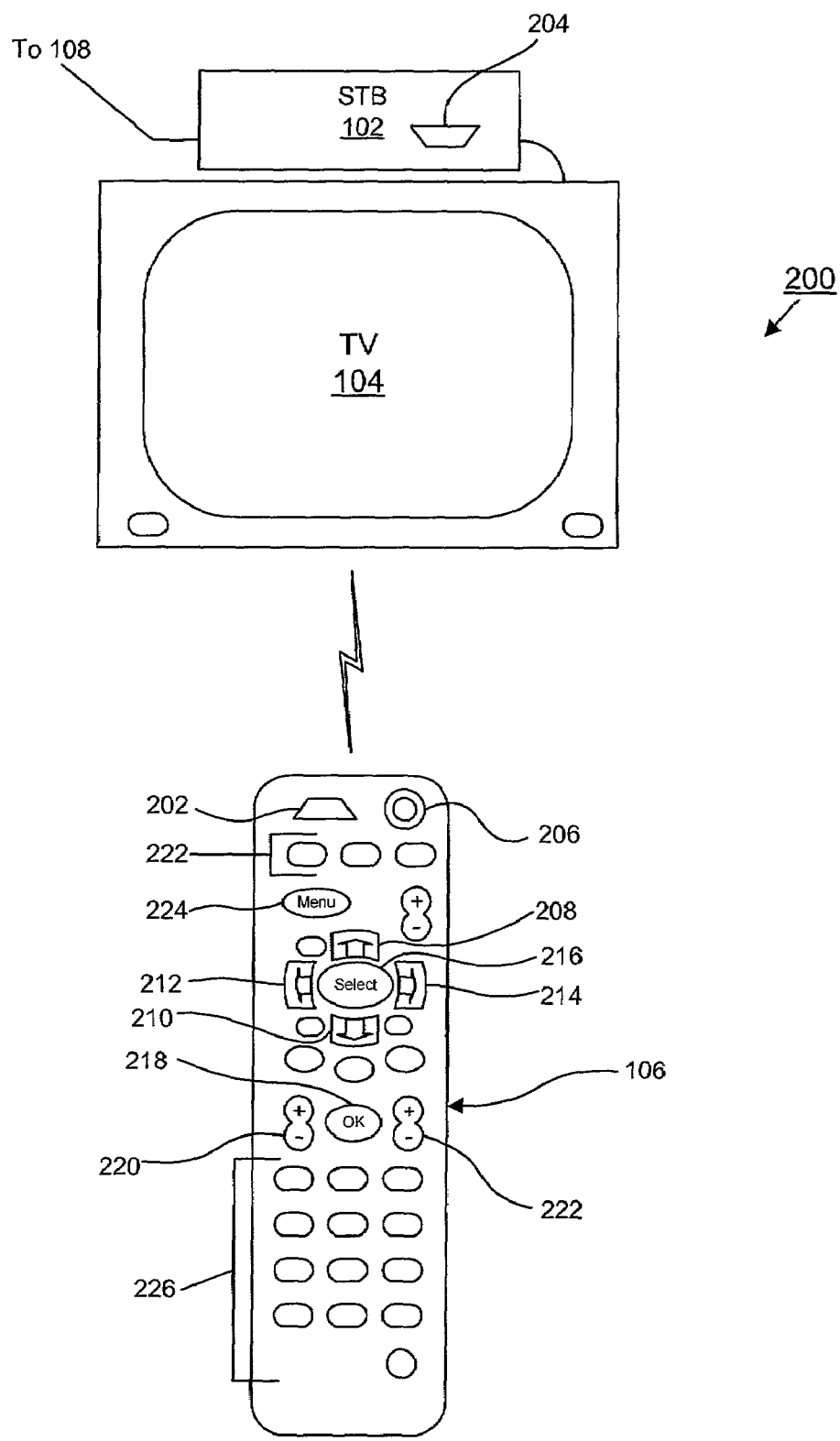
FIG. 2 is an illustration of an interactive television system including a remote control and a set top box.

Referring now to FIG. 2, there is shown an interactive television system 200 according to an embodiment of the invention. The depicted system 200 includes an STB 102, a television 104 (or other display device), and a remote control 106. As noted above, the STB 102 is used to access the network 101 via a head-end 108. In an alternate embodiment, the functionality of the STB 102 is integrated into an advanced version of the television 104.

The television 104 receives decoded television signals from the STB 102 and displays the same using conventional techniques. The television 104 may be embodied as a standard, analog television. Alternatively, the television 104 may be equipped to display a digital video stream.

As noted, the remote control 106 is provided for convenient remote operation of the STB 102 and the television 104. In one configuration, control signals are transmitted from a wireless transmitter 202 in the remote control 106 to a wireless receiver 204 in the STB 102 (and the television 104).

As shown in FIG. 2, the remote control 106 includes a plurality of buttons or similar controls. For instance, the remote control 106 may include a power button 206, an up arrow button 208, a down arrow button 210, a left arrow button 212, a right arrow button 214, a "Select" button 216, an "OK" button 218, channel buttons 220, volume buttons 222, "menu" button 224, and alphanumeric buttons 226. Some remote control devices include multi-functional buttons, such as device selection buttons 228.

Figure 3:
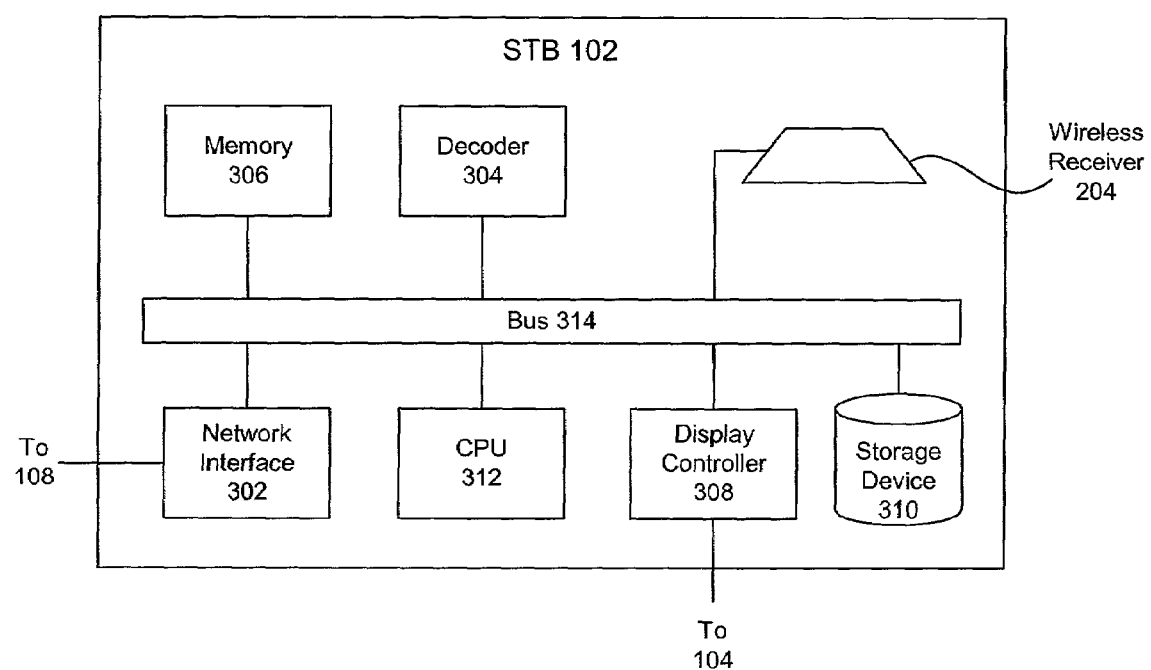
FIG. 3 is a detailed schematic block diagram of a set top box.

Referring now to FIG. 3, there is shown an expanded block diagram of an STB 102 according to one embodiment of the invention. As noted above, the STB 102 includes a wireless receiver 204 for receiving control signals sent by the wireless transmitter 202 in the remote control 106. In various embodiments, the receiver 204 may be configured to receive IR, optical, microwave, VHF, UHF, or other electromagnetic frequencies.

The STB 102 also includes, in one implementation, a network interface 302 for communicating with the network 101 via the head-end 108. The interface 302 may include conventional tuning circuitry for receiving MPEG packets for a selected television channel. The interface 302 may also include conventional buffering and cable modem circuitry for sending or receiving other types of data. For example, the interface 302 may conform to the DOCSIS (Data Over Cable Service Interface Specification) or DAVIC (Digital Audio-Visual Council) cable modem standards.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission is accomplished differently for different networks 101. Alternative ways to accomplish upstream transmission include using a back channel transmission, which is typically sent via an analog telephone line, ISDN, DSL, or other techniques.

In one implementation, the STB 102 also includes a decoder 304, such as an MPEG decoder, for decoding packets from the network 101 containing video streams and other information. As depicted, the decoder 304 may be implemented as a hardware component. Alternatively, or in addition, software decoding may be used.

The STB 102 further includes memory 306, such as a random access memory (RAM), configured to store data for temporary use. Similarly, a read-only memory (ROM) may be provided for storing more permanent data, such as fixed code and configuration information.

In one embodiment, a display controller 308 is provided for converting decoded digital video information into analog signals for display on the television 104. In alternative embodiments, the display controller 308 may provide direct, digital video output for televisions 104 equipped to receive the same. Preferably, the display controller 308 includes graphics hardware for performing bit-block transfers (bit-blits) and other graphical operations.

In some implementations, the STB 102 may also include a storage device 310, such as a hard disk drive, removable storage drive, or the like. The storage device 310 may be configured to record encoded television broadcasts and retrieve the broadcasts at a later time for decoding by the decoder 304 and display by the display controller 308.

The decoder 304, memory 306 or storage device 310 may also be used to store viewer preferences, parental lock settings, electronic programming guide (EPG) data, programming preferences, passwords, e-mail messages, information requests, and the like. In one implementation, the storage device 310 also stores an operating system (OS) for the STB 102, such as Windows CE® or Linux®.

In various embodiments, a Control Processing Unit (CPU) 312 controls the operation of the STB 102, including the other components thereof, which is connected to the CPU 312 via a bus 314. The CPU 312 may be embodied as a state machine, microcontroller, a microprocessor, a digital signal processor (DSP) or other device known in the art. As noted above, the CPU 312 may perform these and other operations based on control signals generated by the remote control 106 and transmitted to the receiver 204.

Of course, FIG. 3 illustrates only one possible configuration of the STB 102. Those skilled in the art will recognize that various other architectures and components may be provided within the scope of the invention. In addition, various standard components of a typical STB 102 are not illustrated in order to avoid obscuring aspects of the invention.

Figure 4:
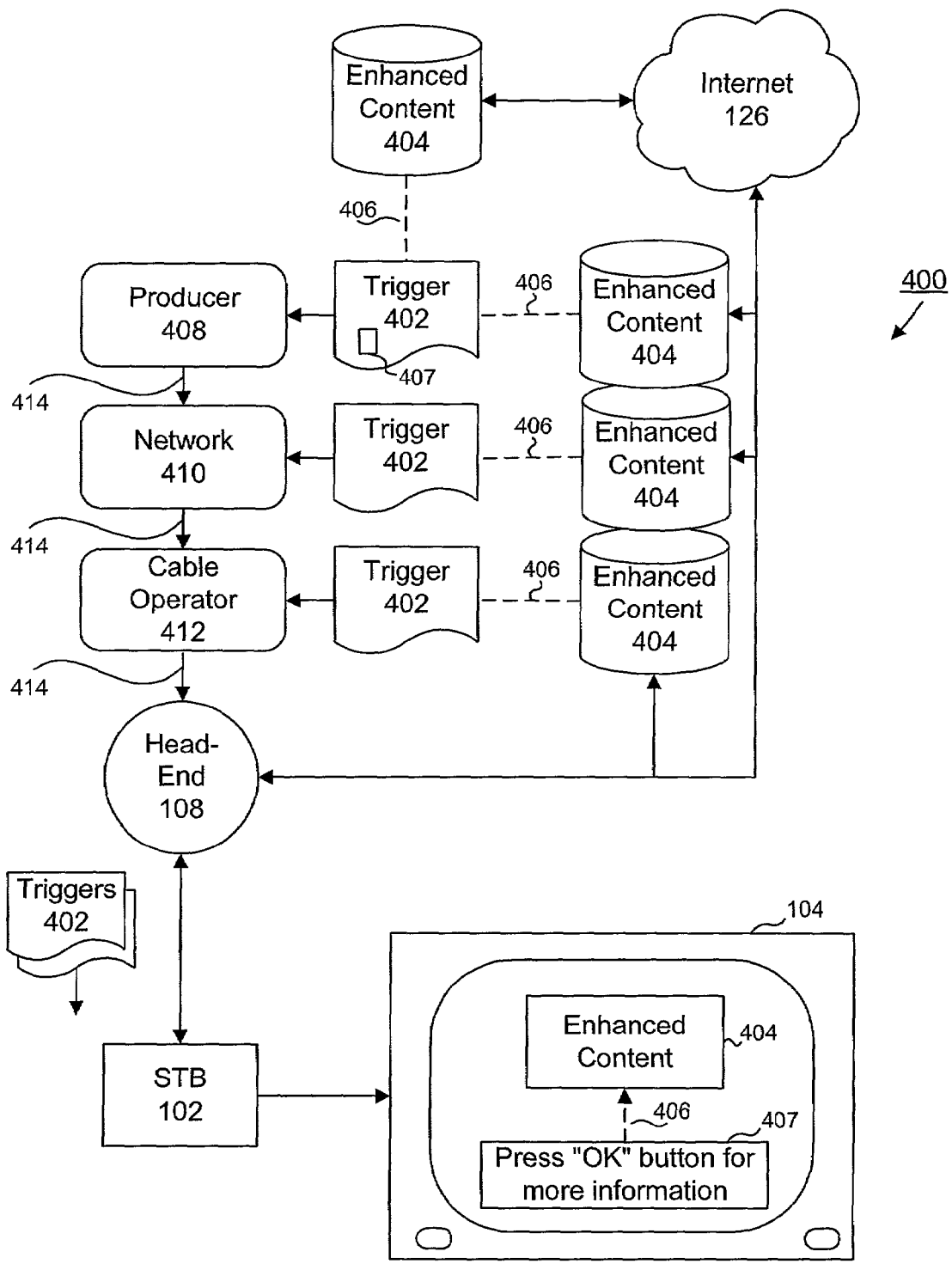
FIG. 4 is a schematic block diagram of a system for modifying embedded triggers within a video transmission.

FIG. 4 is a schematic block diagram of a system 400 for modifying (e.g., blocking, replacing, adding) embedded triggers 402 within a video transmission. As noted earlier, a trigger 402 typically includes a link 406, such as a URL, to various forms of enhanced content 404. For example, a link 406 may include a URL to a commercial website of an advertiser.

Additionally, triggers 402 typically include one or more prompts 407. A prompt is generally a text-based message that notifies the viewer as to the availability of the enhanced content 404. Alternatively, a prompt 407 may be embodied as a code, link, or other mechanism for locating a message for display to a user.

Triggers 402 are embedded into a video stream 414 by various entities, such as a producer 408, a network 410, and/or the cable operator 412, itself. The embedding process depends on the format of the particular trigger 402.

The video stream 414 is received at an STB 102 via a head-end 108, where it may be separated into its components, such as the link 406, prompt 407, and the like. Typically, the prompt 407 is displayed on the television 104 or other display device to alert to user to the availability of the enhanced content.

In response to the user activating the trigger 402, such as by pressing an appropriate button on the remote control 106, the content 404 is retrieved (assuming it was not already embedded in the trigger 402) and displayed on the television 104 or other display device.

Activating the locator link 406 enables enhanced content 404 to be delivered and displayed on the television 104.

In one embodiment, sets of enhanced content 404 may be provided by different sources, such as producers 408, broadcasters 410, or cable operators 412. These unique sets of enhanced content 404 may be stored in separate searchable databases or locations. These databases may also be selectively connected with the Internet 126 and associated enhanced content 404 located therein. For example, a cable operator may provide a URL to a topical "fan site" where the content of the site is generated by a third party. The fan site provides the enhanced content, but is available via the Internet not directly from the cable operator's enhanced content database.

There are various methods for broadcasting and retrieving the enhanced content 404. For example, one broadcast environment may transmit the trigger 402 with a link 406, such as a URL, for retrieving the enhanced content 404. Alternatively, another broadcast environment may transmit the enhanced content 404 with the trigger 402 or shortly thereafter and temporarily store the enhanced content 404 in the STB 102.

In one embodiment, the system 400 allows the cable operator 412 to block the delivery of a trigger 402. Although triggers allow producers 408, network broadcasters 410, and cable operators 412 to provide enhanced content 404, not every user desires enhanced features all of the time. Triggers 402, like advertisements, often distract users from the television broadcast and may actually annoy some users. As enhanced content 404 is only available when triggers 402 are embedded in the broadcast, a cable operator may offer to systematically block the delivery of triggers 402 for certain subscribers or all subscribers.

The system 400 may also allow the cable operator 412 to replace the triggers 402 and the associated enhanced content 404. In one embodiment, a set of enhanced content 404 from one provider, e.g., a cable operator, may supersede enhanced content 404 available from another provider, such as a network broadcaster.

Trigger replacement is particularly useful when there are multiple categories or types of enhanced content available, such as geographic-centric content (international, national, and local) and foreign-language. For example, the cable operator 412 may supersede national enhanced content from the network with local content. Furthermore, the cable operator 412 is generally closer to the end subscriber and may be more aware of special preferences of cable system users. For example, a segment of Spanish subscribers will generally prefer Spanish enhanced content to the typically embedded English content.

Figure 5:
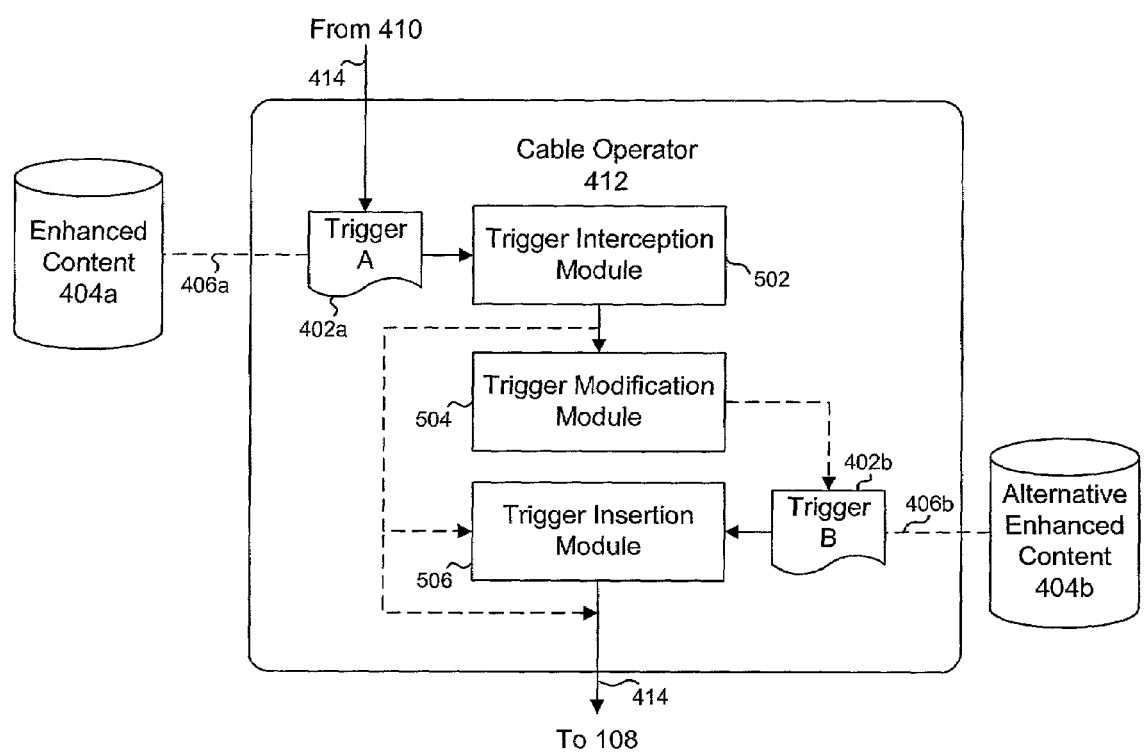
FIG. 5 is a schematic block diagram of a system for processing an embedded trigger.

FIG. 5 illustrates further details of the modification of a trigger 402 by a cable operator 412. As illustrated, the cable operator 412 receives a video stream 414 from the network 410 or producer 408. Embedded within the video stream 414 are one or more triggers 402a that contain links 406a to enhanced content 404a. Upon reception of the trigger 402a, the cable system filters the video stream 414 through a trigger interception module 502. This interception module 502 collects the basic information contained within the trigger 402a, such as the link 406a and the prompt 407.

The intercepted information is compared against established criteria for modification of the video stream 414. Filtering criteria may include system preferences for vendor-, geographic-, and/or language-centric enhanced content. The cable operator 412 controls the application of the filtering criteria via the configuration of the trigger modules 502, 504, and 506. For example, based on the settings of the trigger interception module 502, the trigger 402a is either sent to a trigger modification module 504, to a trigger insertion module 506, or allowed to pass through the cable system unchanged.

In one embodiment the video stream 414 is buffered by the cable system so that the modified trigger 402b may be placed back in the same location as the original trigger 402a prior to transmission to the user. This buffering process is particularly useful when the triggers 402a are contextually associated with the television programming, such as when a narrator or commentator of the television programming requests the viewer to activate the trigger for more information.

The cable operator's filtering criteria used to make modifications by the cable system may also include, in one embodiment, a number of user preferences. The cable operator 412 may collect these user preferences directly from the user by conventional methods, such as the Internet or written survey. One configuration allows the cable operator 412 to receive the information directly from the user's STB 102 or local head-end 108.

Once the user preferences have been determined, the cable operator 412 may program the cable system accordingly. The user preferences may indicate, for instance, the types of alternative enhanced content 404b that the user wishes to receive. For example, the user may indicate that he or she wishes to receive only enhanced content from a particular provider, such as a producer, broadcaster, or non-commercial content provider. Likewise, the user may indicate that he or she wishes to receive only certain types of enhanced content, such as enhanced content related to the actors and actresses performing in the television program being viewed.

The user preferences may also be based on historically observed behavior of the user. For example, the cable operator may note that the user only views enhanced content 404a related to actors and actresses and updates the user preferences and alternative enhanced content 404b accordingly. Furthermore, a user may indicate a desire to exclude certain types of enhanced content 404a, such as e-commerce opportunities or advertisements. Thus, a wide variety of user preferences may be specified to limit or expand the enhanced content available to the user.

If the filtering criteria established by the cable operator 412 for the cable system blocks certain triggers 402a, then the trigger interception module 502 will remove the blocked trigger 402a from the video stream 414 before transmitting the unblocked content to the head-end 108.

Figure 9:
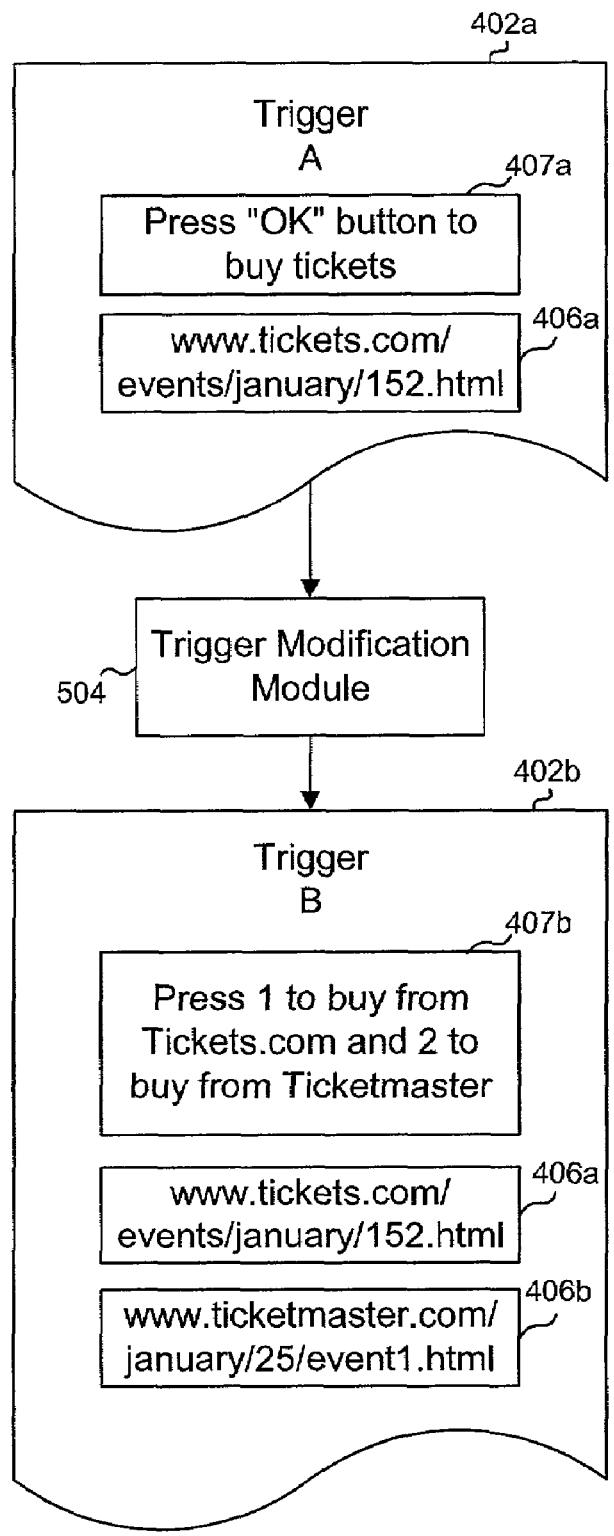
FIG. 9 is a dataflow diagram illustrating the modification of a trigger.

Should the cable operator 412 desire to append an additional link 406b to the originally embedded trigger 402a, the interception module 502 notifies the system of the arrival of the original trigger 402a while the trigger modification module 504 inserts the link 406b to the additional enhanced content material 404b into the trigger 402a. The trigger modification module 504 modifies the prompt 407 contained in the trigger. An example of this situation is illustrated in FIG. 9.

If the cable operator 412 desires the cable system to replace the original trigger 402a, the video stream 414 is passed through the trigger modification module 504. The trigger modification module 504 removes the trigger 402a from the video stream 414. Following the removal, the trigger insertion module 506 inserts the alternative trigger 402b back into the video stream 414 for transmission to head-end 108. As previously mentioned, one system configuration may buffer the video stream 414 until the additional trigger 402b can be inserted at the same point in the broadcast as the original trigger 402a via the trigger insertion module 506. This insertion process allows the cable operator to synchronize the video broadcast with the enhanced content. Furthermore, the system allows context sensitive insertion of enhanced content. The new trigger 402b is inserted in approximately the same chronological position as the original trigger 402a relative to the television programming. Further examples of these types of modifications are illustrated in more detail in FIGS. 6 and 7.

Figure 6:
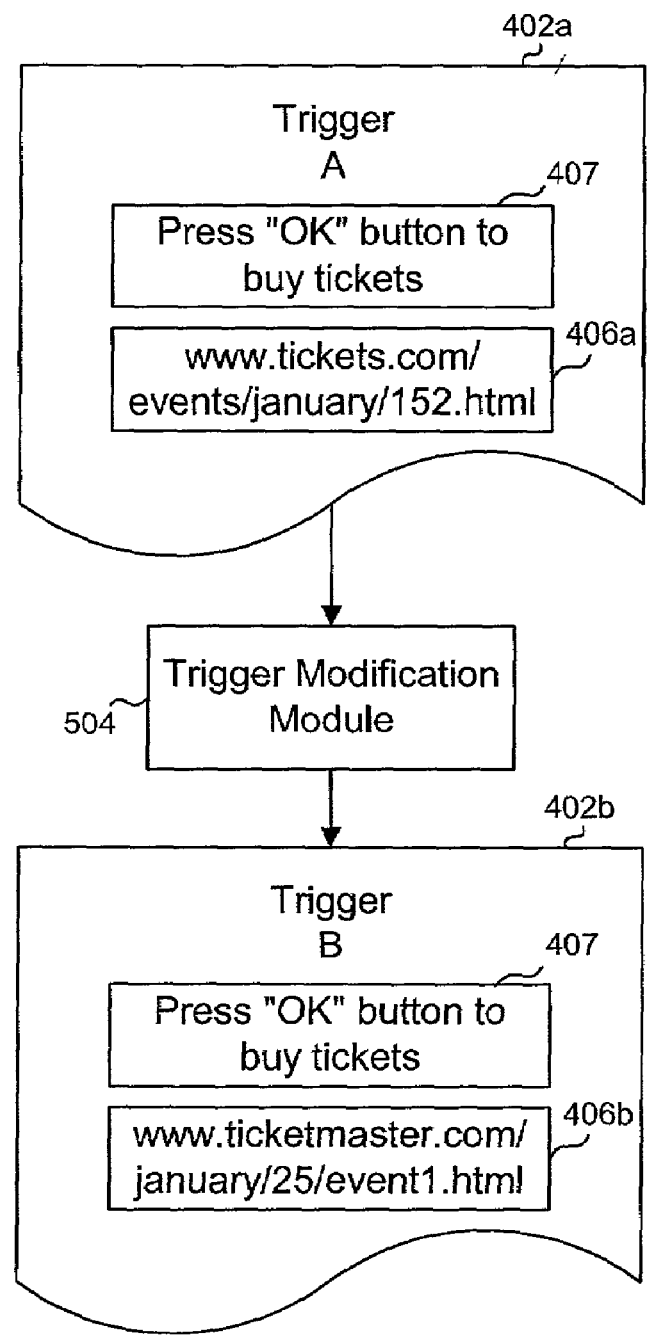
FIG. 6 is a dataflow diagram illustrating the replacement of a trigger.

FIG. 6 is a dataflow diagram illustrating the replacement of a trigger by a trigger modification module 504. Suppose the trigger 402a contains a first link 406a and a prompt 407. If activated, the first trigger 402a would connect the user via the link 406a to enhanced content 404 containing information about tickets available from Tickets.com for events in January. An original producer or network may have arranged with Tickets.com to direct their users to this particular link for tickets relating to movies or other enhanced content relevant to the video screen.

The cable operator 412, however, may need to modify this trigger. For example, Tickets.com may not provide tickets to users in a particular area. As such, the trigger modification module 504 modifies the original trigger 402a with a second trigger 402b by replacing the link 406a with the new link 406b. In this case, the link to Tickets.com is changed to a link to Ticketmaster.com for events available beginning January $25^{th}$. This methodology also allows the cable operator 412 to update outdated links referenced by the original trigger to contemporary enhanced content.

Additionally, a cable operator 412 may arrange with a local vendor to provide its users with enhanced content 404 related to the services provided by the vendor. For example, suppose a user is watching a golf tournament on ESPN®. During the golf tournament, she can view enhanced programming about the golf tournament and its participants, such as player profiles and course information. The enhanced content 404 and programming generated by ESPN® is allowed by her cable operator 412 to pass through to her television 104.

As part of the broadcast, ESPN® would like to offer viewers various interactive commercials for buying tickets to upcoming golf tournaments. ESPN® has selected Tickets.com to provide those tickets, but the cable operator 412 has a relationship with Ticketmaster.com and wants to substitute a second trigger 402b into the video stream for the original trigger 402a embedded by ESPN®. In one embodiment, the cable operator 412 modifies the interactive trigger 402a offering tickets through Tickets.com by replacing the link 406a with a Ticketmaster.com link 406b. The user simply sees a promotional clip from ESPN® offering tickets, and has no idea that ticket vendors were swapped by the cable operator 412.

Figure 7:
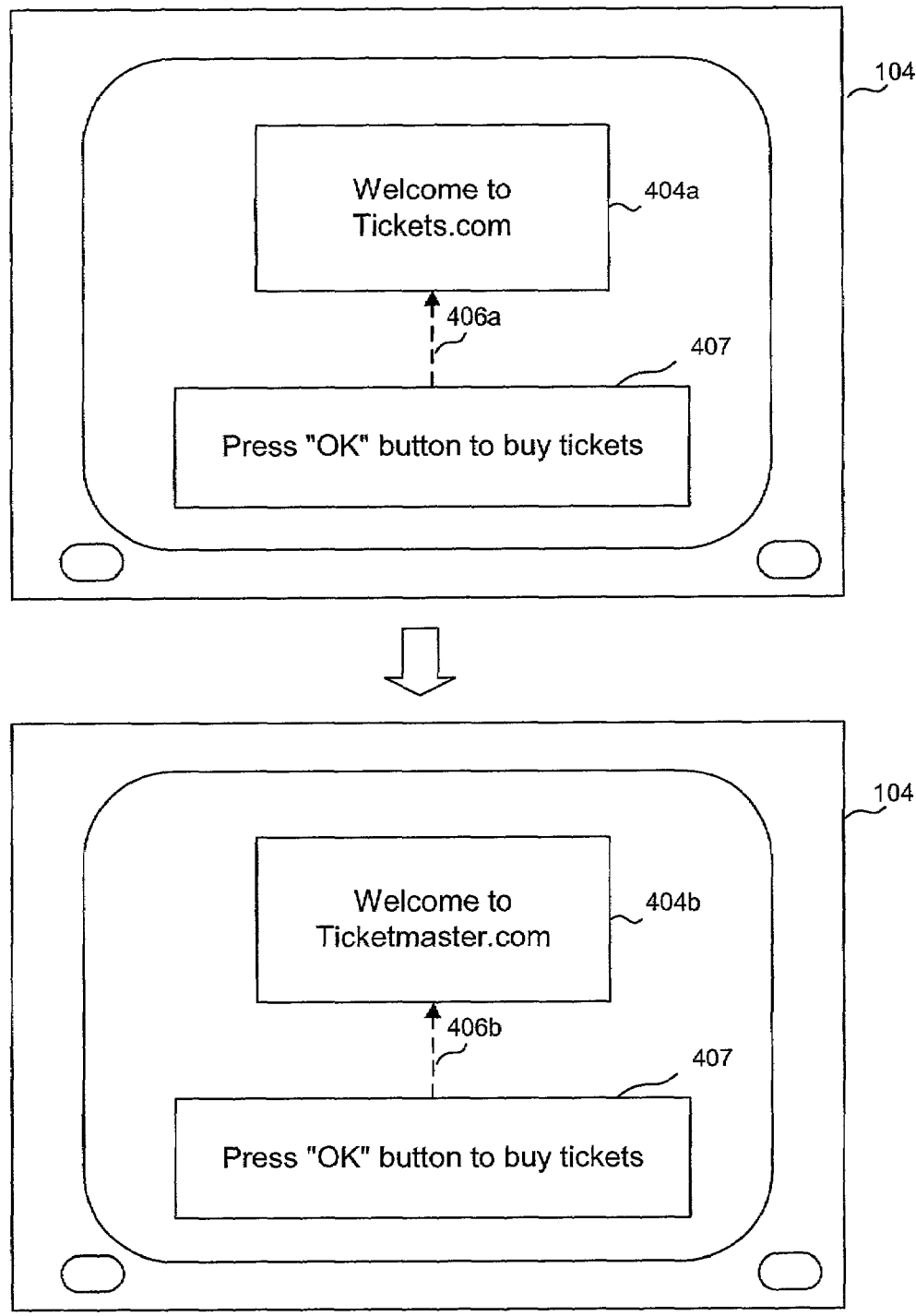
FIG. 7 is an exemplary screen display illustrating the effect of a trigger replacement.

FIG. 7 illustrates an exemplary television screen layout displaying the effect of replacing a link 406, e.g. link 406a with link 406b. The trigger modifications performed in FIG. 6 change the linked enhanced content 404a from a website maintained by Tickets.com to enhanced content 404b provided by Ticketmaster.com.

The display device 104 would normally display prompt 407 requesting activation by the viewer to buy tickets. If the user presses the "OK" button 218, then the interactive television system 200 displays enhanced content 404a, in this case a site maintained by Tickets.com. Following the replacement of link 406a with link 406b, as previously described in FIG. 6, the television 104 may initially display the same prompt 407. However, after the "OK" button 218 is pressed, the television 104 now displays the alternative enhanced content 404b, e.g., a site maintained by Ticketmaster.com.

Figure 8:
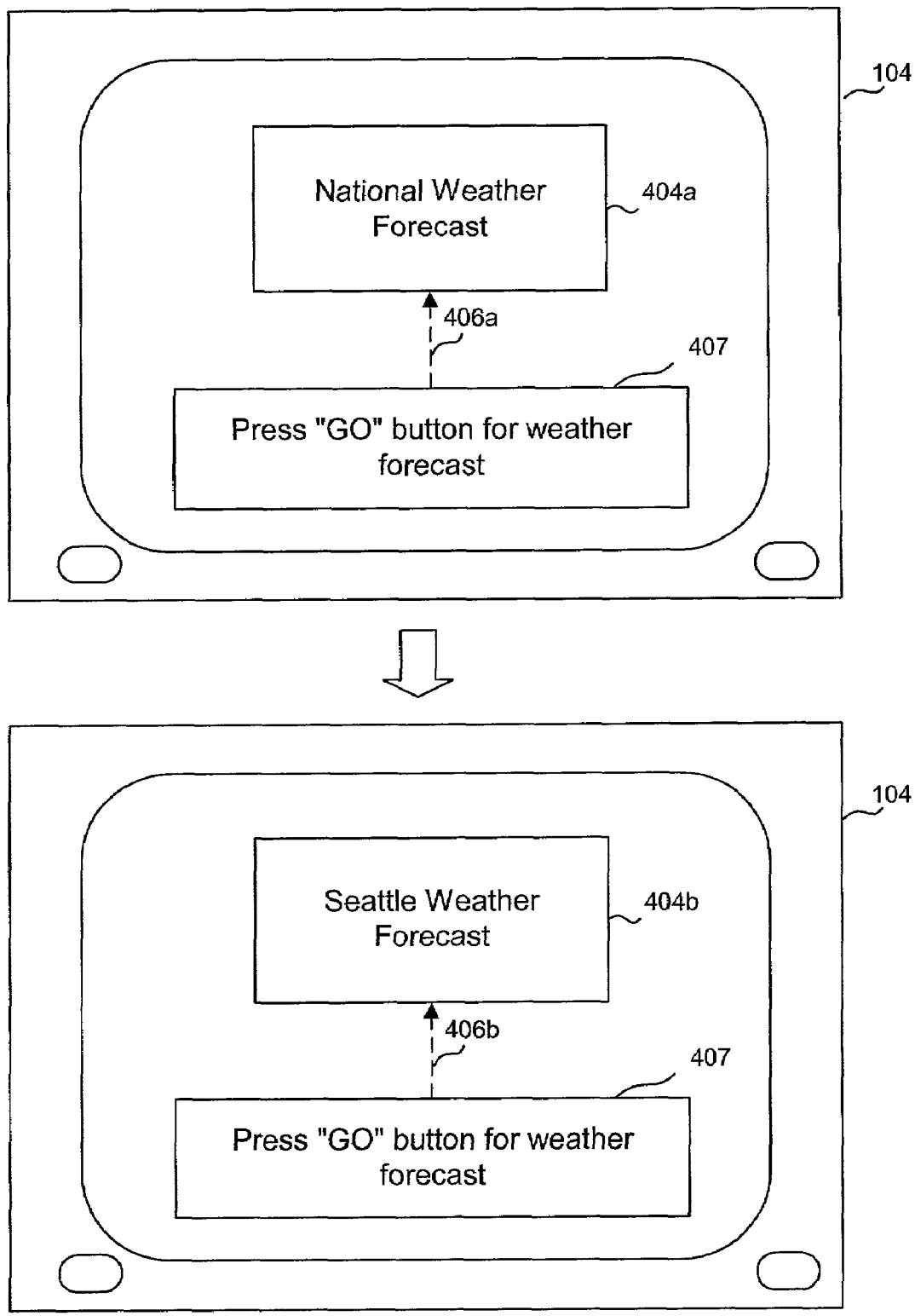
FIG. 8 is an exemplary screen display illustrating the effect of a trigger replacement.

FIG. 8 is an exemplary television screen layout illustrating the effect of replacing a trigger. In the original video stream 414 sent from the producer 408 and the network 410, a trigger 402a was embedded containing the prompt 407 "press 'go' button for weather forecast." The original trigger link 406a referencing a national weather forecast as part of the enhanced content 404a. Following the trigger modification, the prompt 407 remains the same, however the replacement link 406b now directs the viewer to alternative enhanced content 404b containing a local Seattle weather forecast. More specifically, the trigger modification changes the scope of the enhanced content 404 available to the user. Altering the scope of enhanced content 404 associated with a trigger 402 can be easily performed in many genre categories. Scope changes include changes based on geographic, language, religious affiliation, gender, ethnicity, and time criteria.

In one embodiment, the system automatically alters the scope of enhanced content 404 within a genre according to pre-selected user preferences. For example, a user may prefer to receive national business news, local weather, and international soccer scores. More specifically, the scope of the enhanced content 404 referenced by the trigger 402 may either be limited or expanded by the modification. For example, a weather trigger could be changed from a state link to a national link or to a community link. Similar scope changes could be made for many other genre and sub-genre categories. Exemplary genre categories include weather, news, politics, sports, travel, business, money, education, cooking, television programming, cultural events, health, and other informational categories.

FIG. 9 is a dataflow diagram illustrating the modification of a trigger 402. The trigger 402a is received by trigger modification module 504 and altered to contain additional information and links found in the trigger 402b. As originally embedded, the trigger 402a contained a prompt 407a as well as a link 6406a. Because an additional link 406b was being added to the trigger 402b, the prompt 407b was altered to include the additional information and allow the user to make a choice between links 406a and 406b. Modified Trigger 402b contains two links, link 406a to "www.Tickets.com" and link 406b to "www.Ticketmaster.com."

In an alternative embodiment, the trigger modification module 504 does not alter the prompt 407a, but merely appends the additional link 406b to the original link 406a. The STB 102 may automatically or sequentially display both sets of enhanced content 404a and 404b referenced by the links upon receiving the proper activation sequence from the user, e.g., pressing the "OK" button 218.

Figure 10:
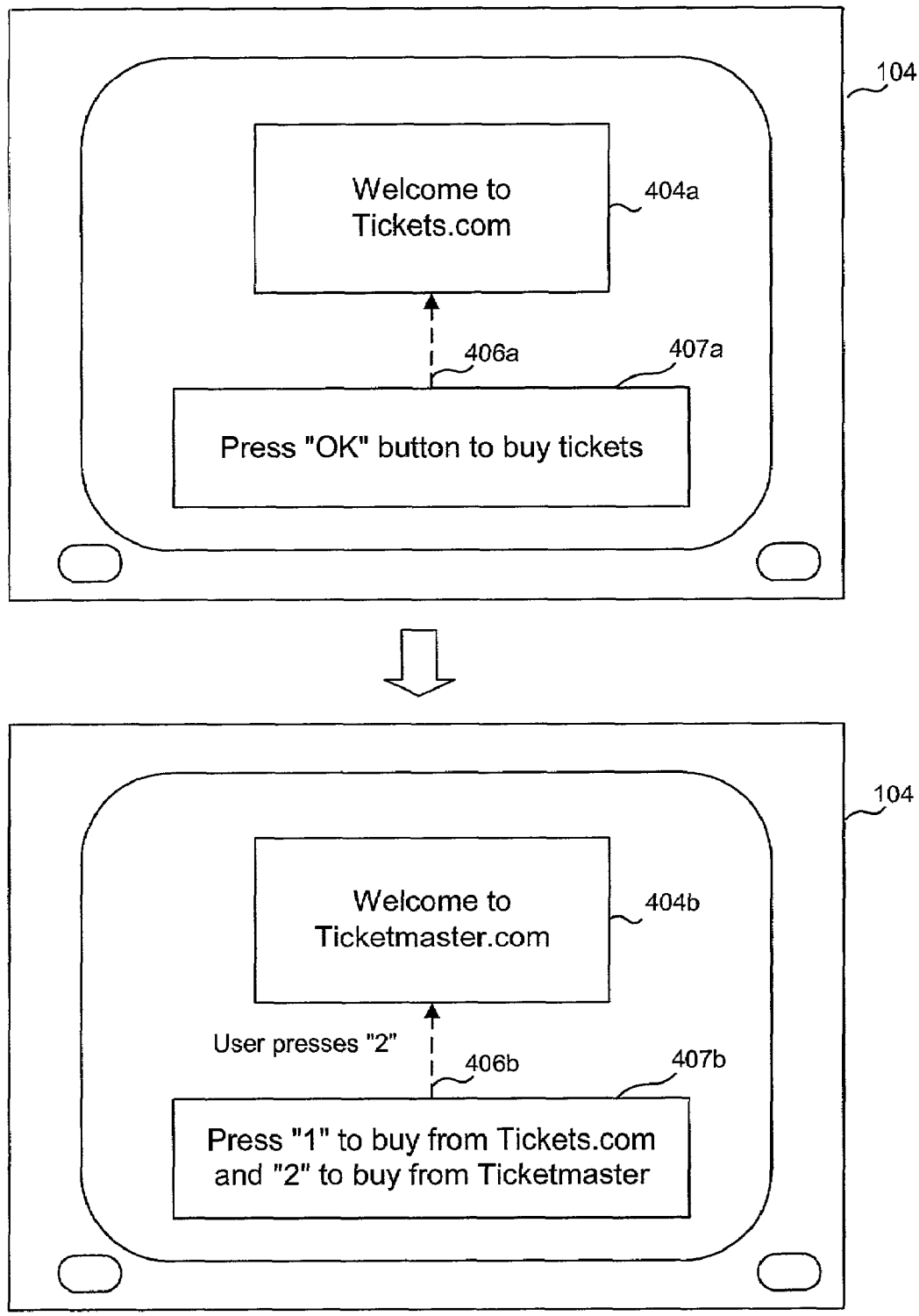
FIG. 10 is an exemplary screen display illustrating the effect of a trigger modification.

FIG. 10 is an exemplary screen display illustrating the effect of modifying a trigger 402. As noted previously, the embedded trigger prompt 407a and subsequent enhanced content 404a is displayed on the television 104 simultaneously with, or in place of, the television program being viewed. Following the trigger modification illustrated in FIG. 9, the message displayed on television 104 is also updated from prompt 407a to prompt 407b, which now includes reference language directing the user to both sets of available enhanced content 404a and 404b. Once a selection is made, the selected enhanced content 404b, e.g., provided by Ticketmaster.com, is displayed on the television 104 simultaneously with, or in place of, the television program being viewed.

Returning to the ESPN® golf tournament example, the cable operator 412 may choose to supplement the ticket purchasing choices available to the user. This is accomplished by adding a second link 406b associated with the enhanced content 404b that is provided by an alternative vendor, such as Ticketmaster.com. The second link 406b is supplied in addition to the original link 406a already embedded by ESPN®. The user would see the coordinated promotional clip from ESPN offering tickets, followed by a modified prompt 407b offering a choice between Tickets.com and Ticketmaster.com to purchase the tickets. If the user wants to purchase tickets, she can choose which vendor or service to use. Upon selection of a vendor, she is connected via a locator link 406 to the selected enhanced content or website.

The cable system also allows the cable operator 412 to selectively filter enhanced content 404 and programming. For example, the system 400 may pass through the triggers 402 associated with enhanced content 404, such as the player profiles and course information, while blocking all interactive commercials. Even the blocking of interactive commercials may be modified to perform selective filtering to exclude commercials foreign to the viewing area.

The user interface is altered in one configuration so that the interface presents a prompt 407 containing a list of vendors with links 406 to enhanced content 404 from which the user may choose. The trigger 402 that activates the user interface may include multiple links 406 to enhanced content. 404. These links 406 may be converted into short descriptions for inclusion in the prompt 407. This conversion may be accomplished using documents encoded in a markup language, such as the hypertext markup language (HTML). For example, if the user watching a golf tournament on ESPN® develops the desire to golf, then a trigger 402 embedded by the cable operator 412 containing a related list of links 406 to enhanced content 404, such as local golf courses and available tee times, would greatly enhance the users viewing experience and enable the cable operator 412 to facilitate the transaction between the vendor and the user.

Figure 11:
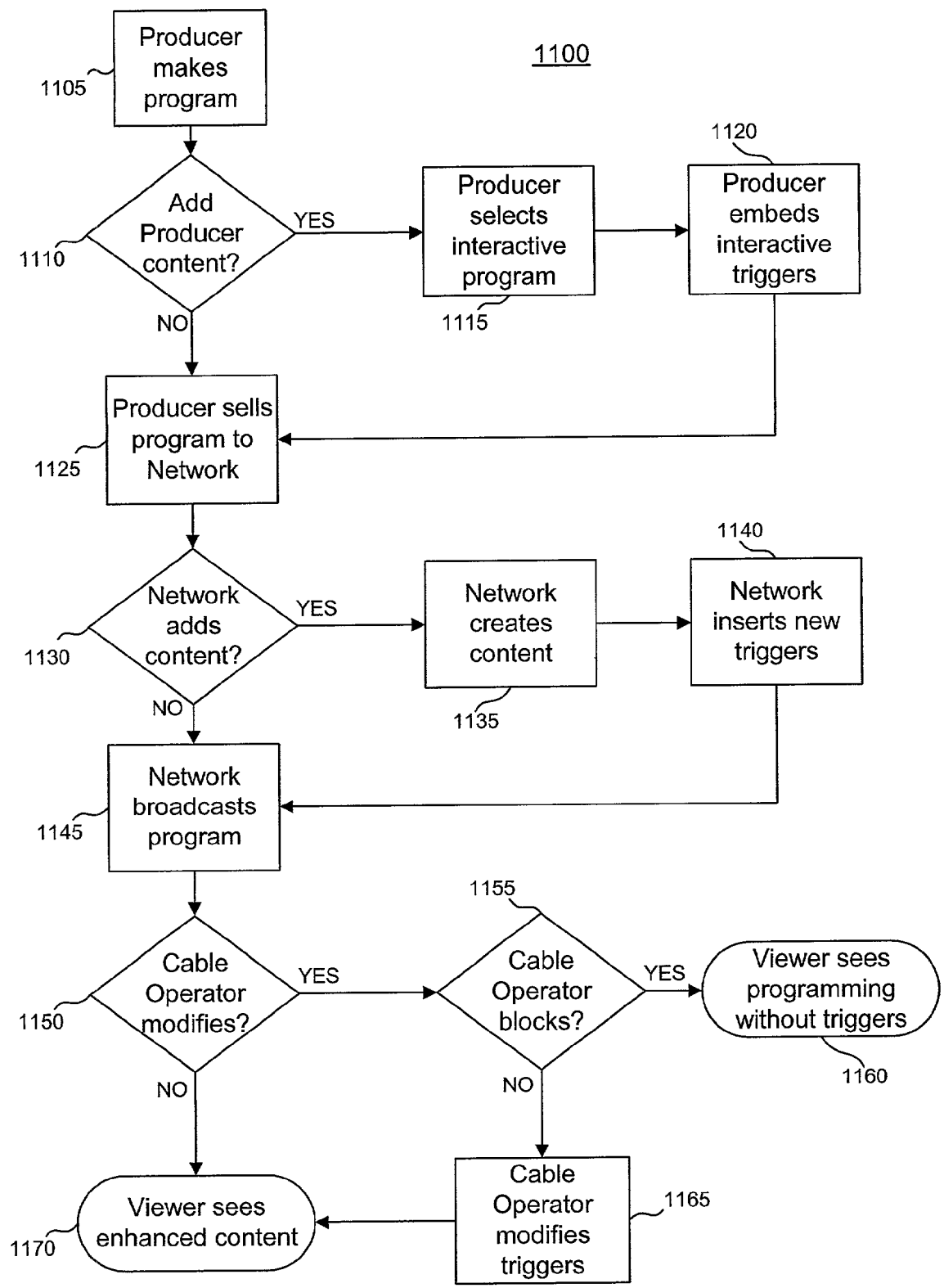
FIG. 11 is a flowchart of a method for delivering enhanced content.

FIG. 11 is a flowchart of a method for delivering enhanced content. The method 1100 begins by creating 1105 the television programming. The television programming may be an original production or merely a conversion of an existing movie or film into a suitable broadcast television format.

In one embodiment, the producer determines 1110 whether to provide enhanced content with the programming. As previously mentioned, enhanced content may include, for example, additional information about the television broadcast, related Internet website links, images, streaming video, e-commerce opportunities, and the like. If the producer decides not to include enhanced content, production ends and the producer delivers 1125 (e.g., sells) the programming to a network or other distribution mechanism, as discussed below.

If, however, the producer decides to provide enhanced content, the producer embeds 1120 the necessary triggers (such as ATVEF triggers) into the video stream to access the enhanced content. As previously mentioned, various mechanisms known to one of skill in the art are used to encode or "embed" triggers for each delivery standard.

Upon completion of the production stage, the programming is transferred 1125 to the broadcast network. Like the producer, the broadcast network determines 1130 whether additional enhanced content should be added to the programming. If no additional content is added, the programming is broadcast 1145. If the network 410 decides that additional content is desired, then the network 410 must program or create 1135 additional content for the programming. Generally, the broadcast network will focus on adding commercial content, but it may also maintain non-commercial supplemental content databases.

The network 410 may insert 1140 the additional triggers into the programs video stream. These additional triggers are associated with the supplemental content provided by the network and selected sponsors. For example, one trigger may include a URL link to a sponsor's website. Upon insertion of the additional triggers, the programming is broadcast 1145 to the cable operator 412.

As previously mentioned, the broadcast 1145 may take many forms, for example, television and radio broadcasts are currently being sent over both analog and digital systems using terrestrial, cable, satellite, and Internet networks. Traditionally, the cable operator 412 receives the broadcast 1145 from the network and transmits the broadcast to the end-user. In one embodiment, the local station or cable operator 412 receives the transmission of the video stream and buffers or saves the transmission for delayed transmission of the programming. This delay may be a few seconds or as long as several days depending in part on the agreements established between the cable operator 412 and the network. Technically, the content could be stored indefinitely for later transmission or for reference in generating customized enhanced content.

Upon reception of the programming, the cable operator 412 determines 1150 if it will modify the programming received from the network. If no changes are made, the viewer sees the enhanced content 1170 originally provided by the producer and network. When changes are to be made, the cable operator 412 determines 1155 if all enhanced content 404 will be blocked. If the cable operator 412 chooses to block the enhanced content 404, then the subscriber views 1160 the programming without triggers.

If the cable operator 412 is not blocking the enhanced content, the system modifies 1165 the triggers 402 according to the filtering criteria of the cable operator 412. For example, the cable operator 412 may add, append, filter, or replace embedded triggers in the video stream. Blocking or filtering at least some of the enhanced content allows the subscriber to view 1170 the programming without the blocked triggers.

Adding enhanced content changes the broadcast seen by the viewer 1170 to include the original programming and the additional enhanced content. If the cable operator 412 chooses to append additional enhanced content, the viewer will see 1170 the original triggers modified to include additional references to the supplemental enhanced content provided by the cable operator 412. If the cable operator 412 chooses to replace enhanced content 404, the viewer will see 1170 the original television programming with links 406 pointing to the replacement enhanced content 404.

Figure 12:
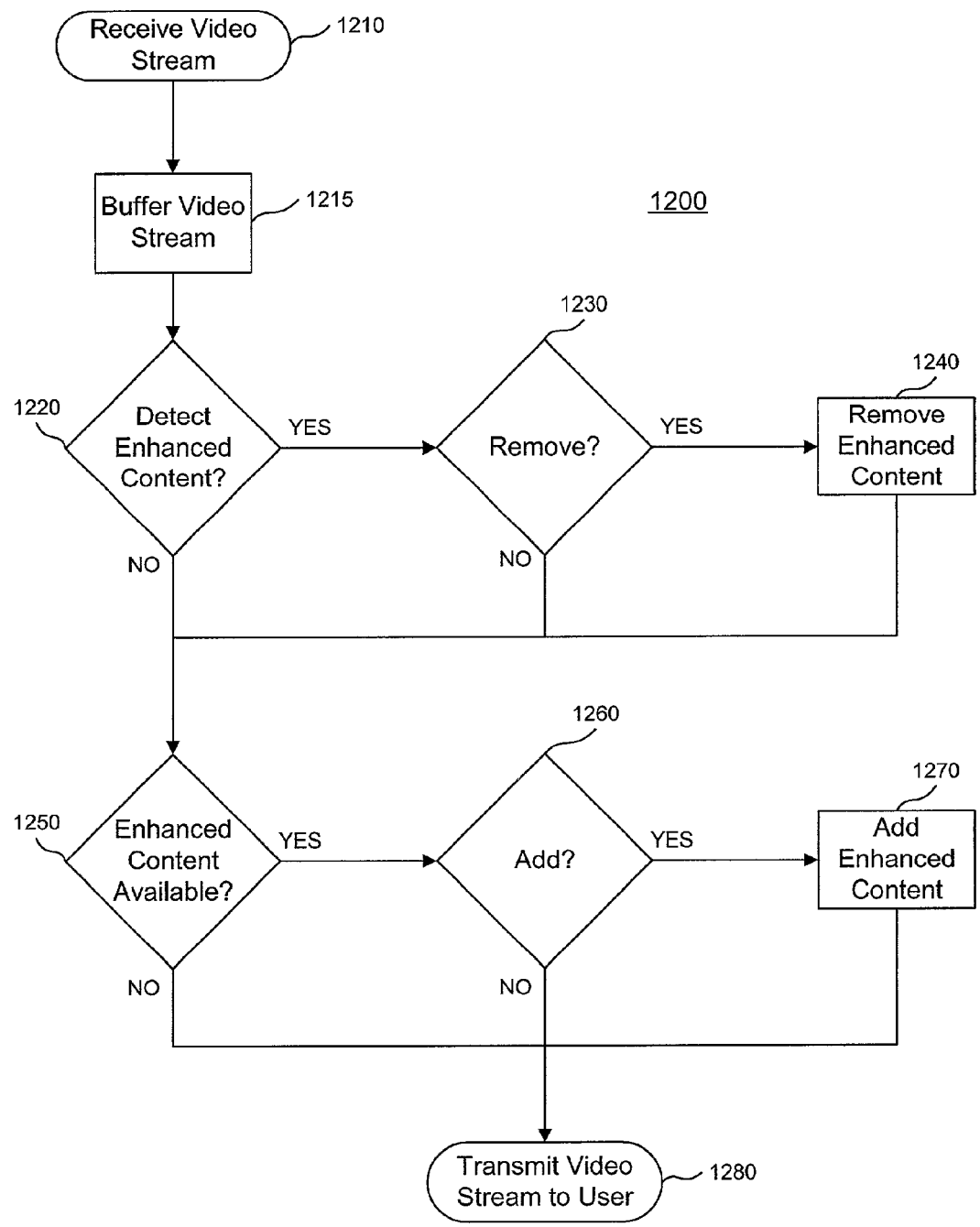
FIG. 12 is a flowchart of a method for modifying enhanced content embedded within a video stream.

FIG. 12 is a flowchart of a method 1200 for modifying enhanced content embedded within the video stream. The modification process begins when a system receives 1210 a video stream 414 containing the programming and the enhanced content. In one implementation, the video stream 414 is buffered 1215 to ensure picture quality when the video stream 414 is retransmitted and to enable the cable operator 412 to make modifications to the video stream 414. The system reviews the video stream to determine 1220 whether there is any enhanced content. If enhanced content is detected, then the system determines 1230 whether the content should be removed. If removal is necessary, then the system performs 1240 the removal. Removal is necessary when the desired modification involves blocking, replacing, and filtering the embedded triggers. In some trigger protocols the process of appending also requires some prompt 407 and link 406 components be removed.

Removal can be accomplished in many different ways. For example, the system can separate all of the enhanced content from the video stream. Once the enhanced content is separated, the unnecessary components of the trigger 402, link 406, or pointer can be removed. In a one-way broadcast system the received enhanced content should also be removed.

If the system does not detect 1220 the presence of enhanced content 404, then the system must determine 1250 whether there is any enhanced content 404 available for this portion of the video stream 414. This query for additional enhanced content 404 may also be performed by the system following either pass through or removal of the detected enhanced content 404. If the query 1250 does not find suitable enhanced content 404, then the video stream is transmitted 1280 to the user.

If enhanced content 404 is discovered, then the system determines 1260 whether the content should be added or inserted into the video stream 414. The video stream 414 is then transmitted 1280 to the user when the enhanced content 404 is not added.

If the enhanced content 404 is added, then the system modifies 1270 the video stream 414 to add the supplemental enhanced content 404. Addition or insertion may be necessary when the desired modification involves adding, inserting, replacing, and appending the embedded triggers 402. In some trigger protocols the process of filtering may require the insertion of some prompt 407 and link 406 components. Insertion may include decoding, amending, and encoding the previously encoded enhanced content 404. Other protocols allow new triggers 402 to be substituted for existing triggers 402 without requiring the entire video stream 414 to be decoded.

More sophisticated chronological or contextual based insertions may involve triggers 402 that are linked to events or statements within the television programming. For example, an interactive advertisement may display the triggers 402 associated with enhanced content 404 during a commercial. To maintain the integrity of the programming relative to the triggers 402, the system may maintain an index of where the original triggers 402 were embedded in the video stream 414. Upon completion of the trigger modifications, the index enables the system to properly add 1270 the enhanced content 404 back into the buffered video stream at the same location as the original trigger 402. Exemplary indexes that help the system reinsert triggers 402 at the appropriate point in the broadcast include contextual and chronological indexes. A contextual index associates trigger position with the text of the television programming, while the chronological index associates the trigger relative to transmission time.

Based upon the foregoing, the present invention offers numerous advantages not available in conventional approaches. For example, the present invention allows a cable operator to modify, through a method of selective removal and addition, a trigger 402 associated with enhanced content 404 that is embedded in the video stream 414. In addition, the present invention allows for a high degree of system wide personalization, unlike conventional, trigger-based approaches.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for modifying enhanced programming for an interactive television system, the method comprising:

intercepting a first trigger at a cable operator facility, the first trigger being embedded in a television broadcast and comprising a first link and a prompt, the prompt calling for single action for displaying information associated with the first link;

creating a second trigger by adding a second link to the first trigger and changing the prompt associated with the first trigger to call for least two alternative actions including a first action for displaying information associated with the first link and a second action for displaying information associated with the second link; and replacing the first trigger with the second trigger within the television broadcast.

2. The method of claim 1, wherein the first link relates to enhanced content for a first geographic location and wherein the second link relates to enhanced content for a second geographic location.

3. The method of claim 1, wherein the first link relates to content of national interest and the second link relates content of local interest.

4. The method of claim 1, wherein the first link facilitates a purchase from a first vendor and wherein the second link facilitates a purchase from a second vendor.

5. The method of claim 1, wherein the first and second links comprise uniform resource locators (URLs), such that a second trigger contains two distinct URLs.

* * * * *